(12) United States Patent
Kuwabara et al.

(10) Patent No.: US 8,325,274 B2
(45) Date of Patent: Dec. 4, 2012

(54) VIDEO SIGNAL PROCESSING APPARATUS

(75) Inventors: Takashi Kuwabara, Kanagawa (JP);
Yuji Mizuguchi, Kanagawa (JP);
Toshitomo Umei, Kanagawa (JP);
Takuma Shimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/132,992

(22) PCT Filed: Dec. 22, 2010

(86) PCT No.: PCT/JP2010/007444
§ 371 (c)(1),
(2), (4) Date: Jun. 6, 2011

(87) PCT Pub. No.: WO2011/077722
PCT Pub. Date: Jun. 30, 2011

(65) Prior Publication Data
US 2012/0249873 A1    Oct. 4, 2012

(30) Foreign Application Priority Data
Dec. 25, 2009    (JP) ................................. 2009-294174

(51) Int. Cl.
*H04N 7/01* (2006.01)
(52) U.S. Cl. ........................................ 348/459; 348/441
(58) Field of Classification Search .................. 348/441, 348/459, 458, 443, 446–448; *H04N 7/01, H04N 11/20*
See application file for complete search history.

(56) References Cited

U.S. PATENT DOCUMENTS
6,545,653 B1 * 4/2003 Takahara et al. .............. 348/446
7,453,518 B2 * 11/2008 Kimoto ......................... 348/448

FOREIGN PATENT DOCUMENTS
| JP | 63-226175 A | 9/1988 |
| JP | 63-234777 A | 9/1988 |
| JP | 2001-352462 A | 12/2001 |
| JP | 2006-332975 A | 12/2006 |

OTHER PUBLICATIONS
International Search Report for PCT/JP2010/007444, Dec. 25, 2009.

* cited by examiner

*Primary Examiner* — Sherrie Hsia
(74) *Attorney, Agent, or Firm* — RatnerPrestia

(57) ABSTRACT

The object is to provide a video signal processing apparatus capable of minimizing overtaking of fields of a video signal and continuous display of the video signal of the same field and reducing degradation in image quality of the output video signal. The apparatus has a field signal holding section 9 which holds the value of an input field signal and outputs the held value as a held value signal and a readout determination section 10 which determines the video signal of the field to be read out, and which outputs the determined signal as a readout field signal. The field signal holding section 9 holds the value of the input field signal a plurality of times with every occurrence of the readout field signal period, and outputs a held value signal constituted of the plurality of values of the input field signal held. The readout determination section 10 determines the video signal of the field to be read out from a frame memory 4 on the basis of the value of the held value signal in the current readout field period and the value of the held value signal in the immediately preceding readout field period.

3 Claims, 7 Drawing Sheets

Fig.3

| HELD VALUE OF CURRENT FIELD (FIRST HELD VALUE) ||| HELD VALUE OF PRECEDING FIELD (SECOND HELD VALUE) ||| DETERMINATION RESULT (READOUT FIELD SIGNAL) |
|---|---|---|---|---|---|---|
| VALUE FROM 9A | VALUE FROM 9B | VALUE FROM 9C | VALUE FROM 9A | VALUE FROM 9B | VALUE FROM 9C | |
| L | L | L | COMBINATION OTHER THAN LLL ||| VALUE OF PRECEDING FIELD 9A IS INVERTED TO OBTAIN OUTPUT (H) |
| L | L | L | L | L | L | L |
| H | H | H | H | H | H | H |
| H | H | H | COMBINATION OTHER THAN HHH ||| VALUE OF PRECEDING FIELD 9A IS INVERTED TO OBTAIN OUTPUT (L) |
| OTHER THAN LLL OR HHH ||| ANY COMBINATION ||| VALUE OF PRECEDING FIELD 9A IS INVERTED TO OBTAIN OUTPUT |

Fig.7

| HELD VALUE OF CURRENT FIELD (FIRST HELD VALUE) | | HELD VALUE OF PRECEDING FIELD (SECOND HELD VALUE) | | DETERMINATION RESULT (READOUT FIELD SIGNAL) |
|---|---|---|---|---|
| VALUE FROM 9A | VALUE FROM 9B | VALUE FROM 9A | VALUE FROM 9B | |
| L | L | L | L | VALUE OF PRECEDING FIELD 9A IS INVERTED TO OBTAIN OUTPUT (H) |
| L | L | COMBINATION OTHER THAN LL | | L |
| H | H | H | H | VALUE OF PRECEDING FIELD 9A IS INVERTED TO OBTAIN OUTPUT (L) |
| H | H | COMBINATION OTHER THAN HH | | H |
| OTHER THAN LL OR HH | | ANY COMBINATION | | VALUE OF PRECEDING FIELD 9A IS INVERTED TO OBTAIN OUTPUT |

1

VIDEO SIGNAL PROCESSING APPARATUS

CROSS-REFERENCE TO RELATED APPLICATION

This application is based upon and claims the benefit of priority from the prior Japanese Application No. 2009-294174, filed on Dec. 25, 2009; the entire contents of which are incorporated herein by reference.

BACKGROUND OF THE INVENTION

1. Field of the Invention

The present invention relates to a video signal processing apparatus which outputs an input interlaced video signal with a field signal having a period different from the field period of the video signal.

2. Description of the Related Art

In some of the conventional video signal processing apparatuses, an input video signal is stored in a frame memory and control is performed so that a portion of the stored video signal on the side where write access is not performed is read out.

For example, Japanese Patent Laid-Open No. 2006-332975, an art precedent to the present invention, is known.

In the conventional video signal processing apparatus, when an input video signal is output with a field period different from the field period of this video signal, a field signal for the input video signal (input field signal) and a field signal for output (readout field signal) are asynchronous with each other and, therefore, not only overtaking of fields of the video signal but also continuous display of the same field of the video signal occurs. There has been a problem that a moving image is displayed with unnaturalness and degradation in image quality occurs.

The present invention has been achieved to solve the problem of the conventional art and an object of the present invention is to provide an video signal processing apparatus which, when outputting an input video signal with the period of a readout field signal (readout field period) different from the field period of an input field signal (input field period), can minimize overtaking of fields of a video signal and continuous display of the video signal of the same field and reducing degradation in image quality of the output video signal.

SUMMARY OF THE INVENTION

To achieve the above-described object, according to the present invention, there is provided a video signal processing apparatus including a frame memory in which the input video signal is stored on a field-by-field basis, an input determination section which determines whether the input video signal is an odd field or an even field, and which outputs the determination result as an input field signal, a field signal holding section which holds the value of the input field signal a plurality of times with at least every occurrence of the readout field period, and which outputs a held value signal constituted of the plurality of values of the input field signal held, a readout determination section which determines, on the basis of the held value signal output from the field signal holding section, the field to be read out, and which outputs the determination result as a readout field signal, and a memory readout control section which reads out, on the basis of the readout field signal output from the readout determination section, the input video signal stored in the frame memory. The readout determination section determines the field to be read out on the basis of a first held value which is a value of the held value signal in the current readout field period and a second held value which is a value of the held value signal in the immediately preceding readout field period.

The video signal processing apparatus of the present invention holds the value of the input field signal with every occurrence of the readout field period different from the field period of the input video signal, and determines the field to be read out on the basis of the value of the held value signal in the current readout field period and the value of the held value signal in the immediately preceding readout field period.

With this arrangement, overtaking of fields of a video signal and continuous display of the same field of the video signal can be minimized and degradation in image quality of the output video signal can be reduced.

BRIEF DESCRIPTION OF THE DRAWINGS

FIG. 3 is a diagram for explaining the generation of a readout field signal in the apparatus;

FIG. 7 is a diagram for explaining determination at the time of readout of a video signal in the apparatus.

DETAILED DESCRIPTION OF THE PREFERRED EMBODIMENTS

First embodiment

Figure 1:
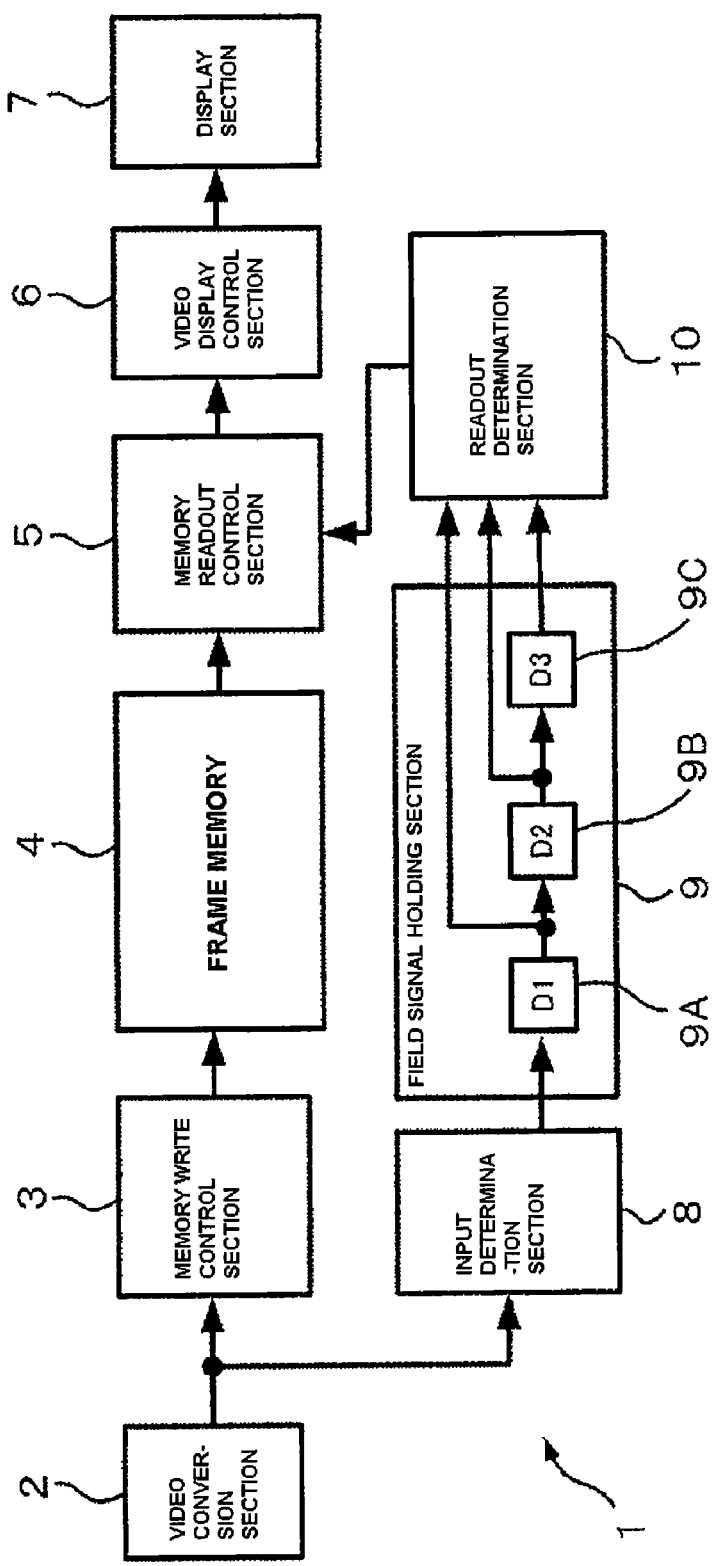
FIG. 1 is a block diagram of a video signal processing apparatus in a first embodiment of the present invention.

A video signal processing apparatus in a first embodiment of the present invention will be described with reference to the accompanying drawings. FIG. 1 is a block diagram of the video signal processing apparatus in the first embodiment of the present invention.

Referring to FIG. 1, the video signal processing apparatus 1 reads out an input interlaced video signal (hereinafter referred to as "input video signal") output from a video conversion section 2, and outputs the video signal with a field signal (hereinafter referred to as "readout field signal") having a period (hereinafter referred to as "readout field period") different from the period of a field signal for the input video signal (hereinafter referred to as "input field signal").

The video signal processing apparatus 1 stores, in a frame memory 4, by the control of a memory write control section 3, the video signal output from the video conversion section 2, reads out, by the control of a memory readout control section 5, the input video signal stored in the frame memory 4 (the read-out video signal hereinafter referred to as "output video signal"), and displays the read-out video signal on a display section 7.

An input determination section 8 determines whether the input video signal is an odd field or an even field, and outputs the determination result as input field signal. This input field signal is input to a field signal holding section 9 operating with a predetermined period, and the value of this input field signal is held. (This held signal is hereinafter referred to as "held value signal".)

This held value signal is input to a readout determination section 10. The readout determination section 10 determines the field to be read out on the basis of the value of the held value signal in the current readout field period (the current field of the readout field signal) (which value hereinafter referred to as "first held value") and the value of the held value signal in the immediately preceding field period (the immediately preceding field of the readout field signal) (which value hereinafter referred to as "second held value"), and outputs the determined field as readout field signal.

The readout field signal is input to a memory readout control section 5. The memory readout control section 5 controls, on the basis of the readout field signal, readout of the input video signal stored in the frame memory 4.

Each section of the video signal processing apparatus 1 will be described in detail below.

The video conversion section 2 outputs an input interlaced analog video signal as an interlaced digital video signal.

The interlaced digital video signal (input video signal) output from the video conversion section 2 is stored in the frame memory 4 under the control of the memory write control section 3. The frame memory 4 has such a capacity as to be capable of storing at least two fields (odd and even fields).

The memory write control section 3 determines whether the input video signal is an odd field or an even field, and performs control so that the input video signal is stored in one of different areas in the frame memory 4 according to whether the input video signal is an odd field or an even field.

Storing in the frame memory 4 is performed with every occurrence of the field period (input field period) of the digital video signal output from the video conversion section 2. The input field period is, for example, in terms of frequency, 60 Hz.

The memory readout control section 5 performs control to read out, on the basis of the readout field signal output from the readout determination section 10, the video signal stored in the frame memory 4. Readout of the video signal from the frame memory 4 can be performed independently of storage of the input video signal.

The readout field signal is a signal for designating readout of either of odd and even fields in the input video signal stored in the frame memory 4.

Readout from the frame memory 4 is performed with every occurrence of the period (readout field period) of the readout field signal different from the input field period. The readout field period is, for example, in terms of frequency, 59.94 Hz.

A video display control section 6 performs control to transmit to the display section 7 the video signal (output video signal) read out from the memory readout control section 5. The display section 7 displays the output video signal as an image. The display section 7 is, for example, a display constituted by a liquid crystal panel.

The input determination section 8 determines whether the input video signal is an odd field or an even field, and outputs the determination result as a field signal. For example, LOW is output when the input video signal is an odd field, and HIGH is output when the input video signal is an even field.

The field signal holding section 9 holds the value of the input field signal output from the input determination section 8 and outputs the held value as a held value signal. The field signal holding section 9 is constituted by shift registers in a plurality of stages, for example, signal holding sections 9A, 9B, and 9C, as shown in FIG. 1. A period with which the signal holding sections 9A, 9B, and 9C are operated is shorter than the readout field period and is, for example, in terms of frequency, about 33 MHz. Each of the values of the field signal held by the signal holding sections 9A, 9B, and 9C is output as a held value signal.

The field signal holding section 9 can accumulate the value (first held value) of the held value signal for the input field signal in the current field of the readout field signal and the value (second held value) of the held value signal for the input field signal in the immediately preceding field of the readout field signal.

The readout determination section 10 determines, on the basis of the first held value and the second held value, the video signal of the field to be read out from the frame memory 4, and outputs the result of this determination as readout field signal. The method of determination will be described below.

The readout determination section 10 recognizes a field change point in the readout field signal on the basis of a vertical sync signal for output falling with every occurrence of the readout field period. The readout determination section 10 sets as the first held value and the second held value the value output from the field signal holding section 9 when a fall of the vertical sync signal for output is detected.

For example, when the readout determination section 10 reads out an odd field of the video signal from the frame memory 4, the readout determination section 10 outputs LOW as readout field signal. When the readout determination section 10 reads out an even field of the video signal from the frame memory 4, the readout determination section 10 outputs HIGH as readout field signal.

Figure 2:
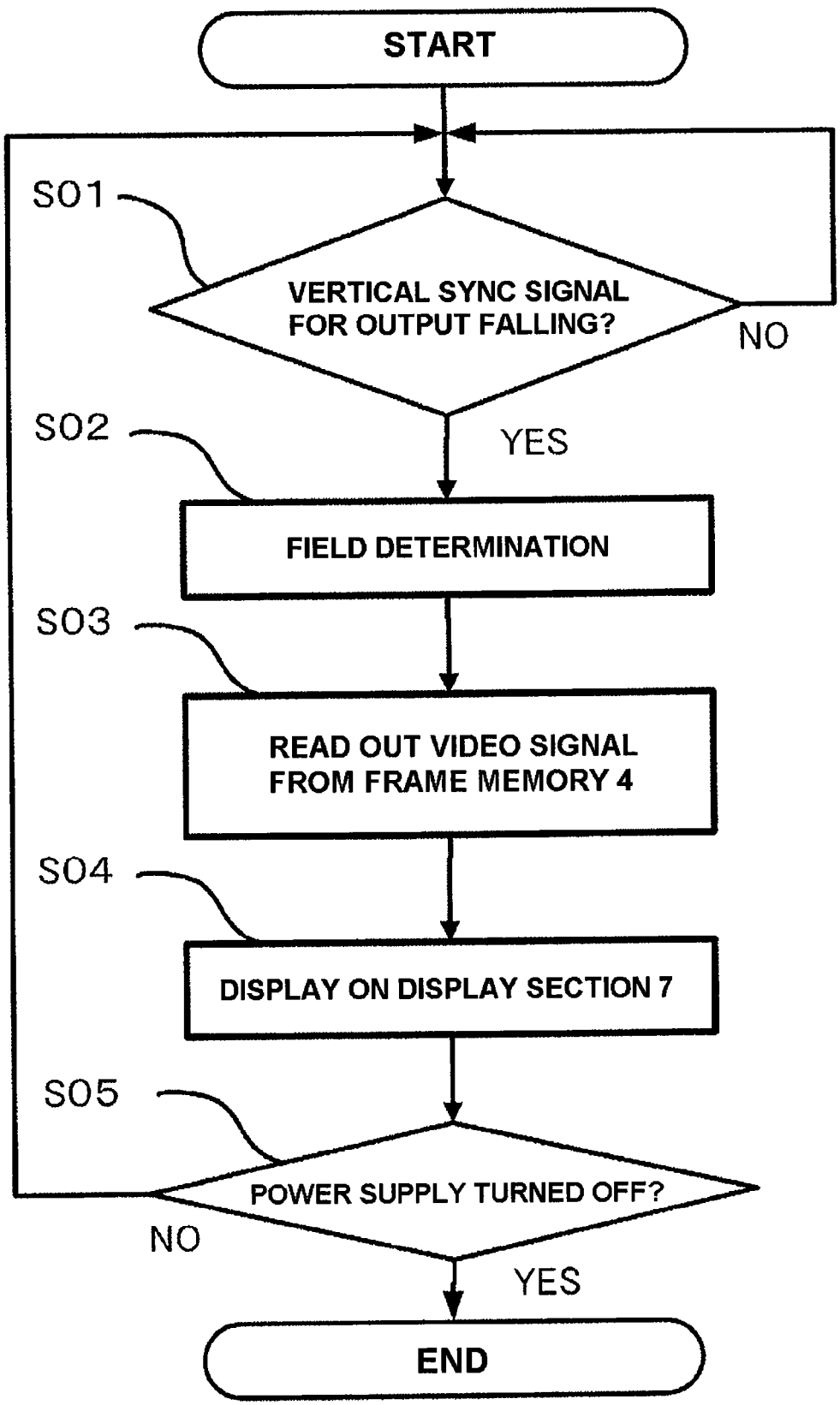
FIG. 2 is a flowchart for explaining the operation of the apparatus.
Figure 4:
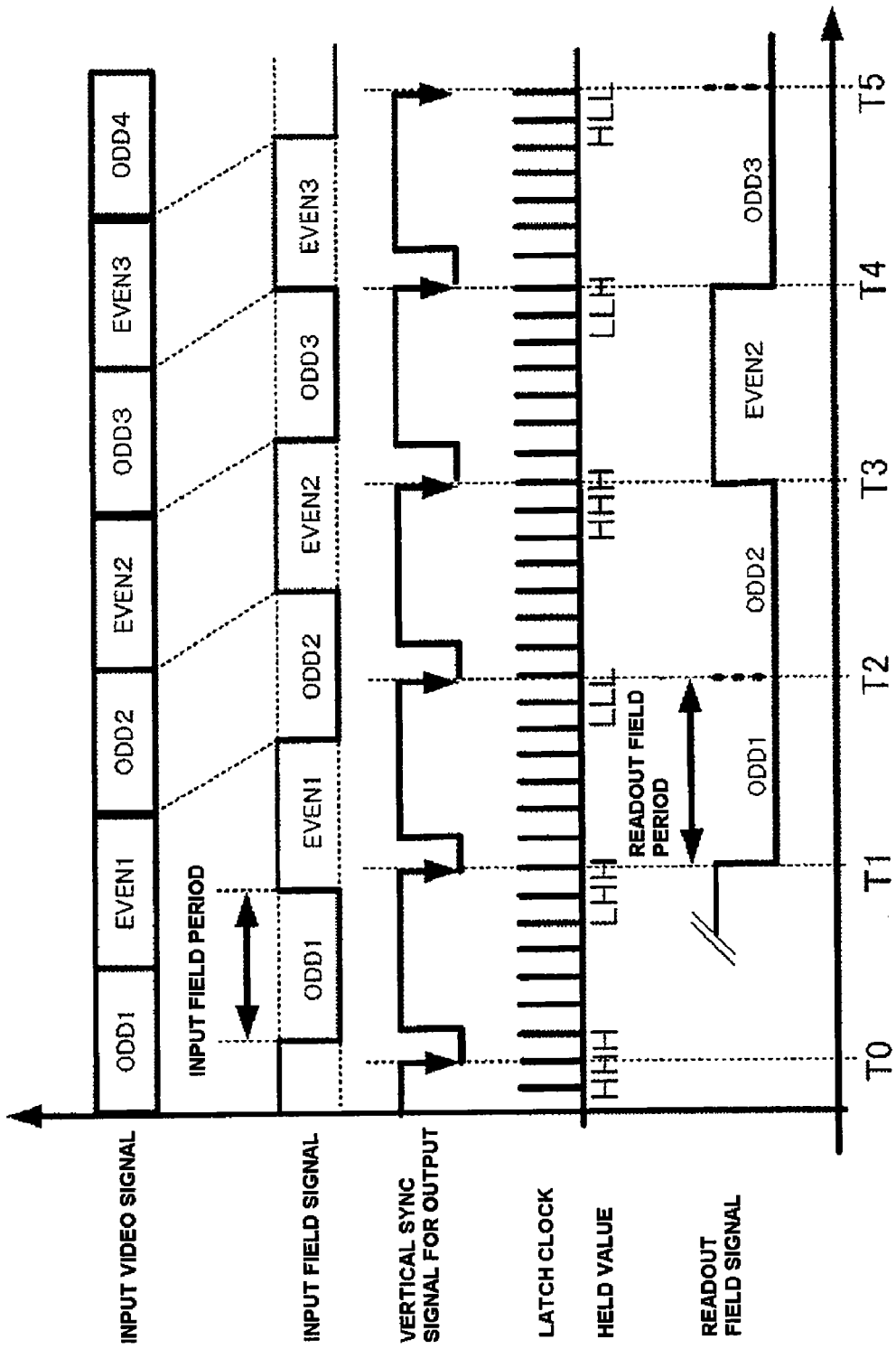
FIG. 4 is a timing chart for explaining video signal readout timing in the apparatus.
Figure 5:
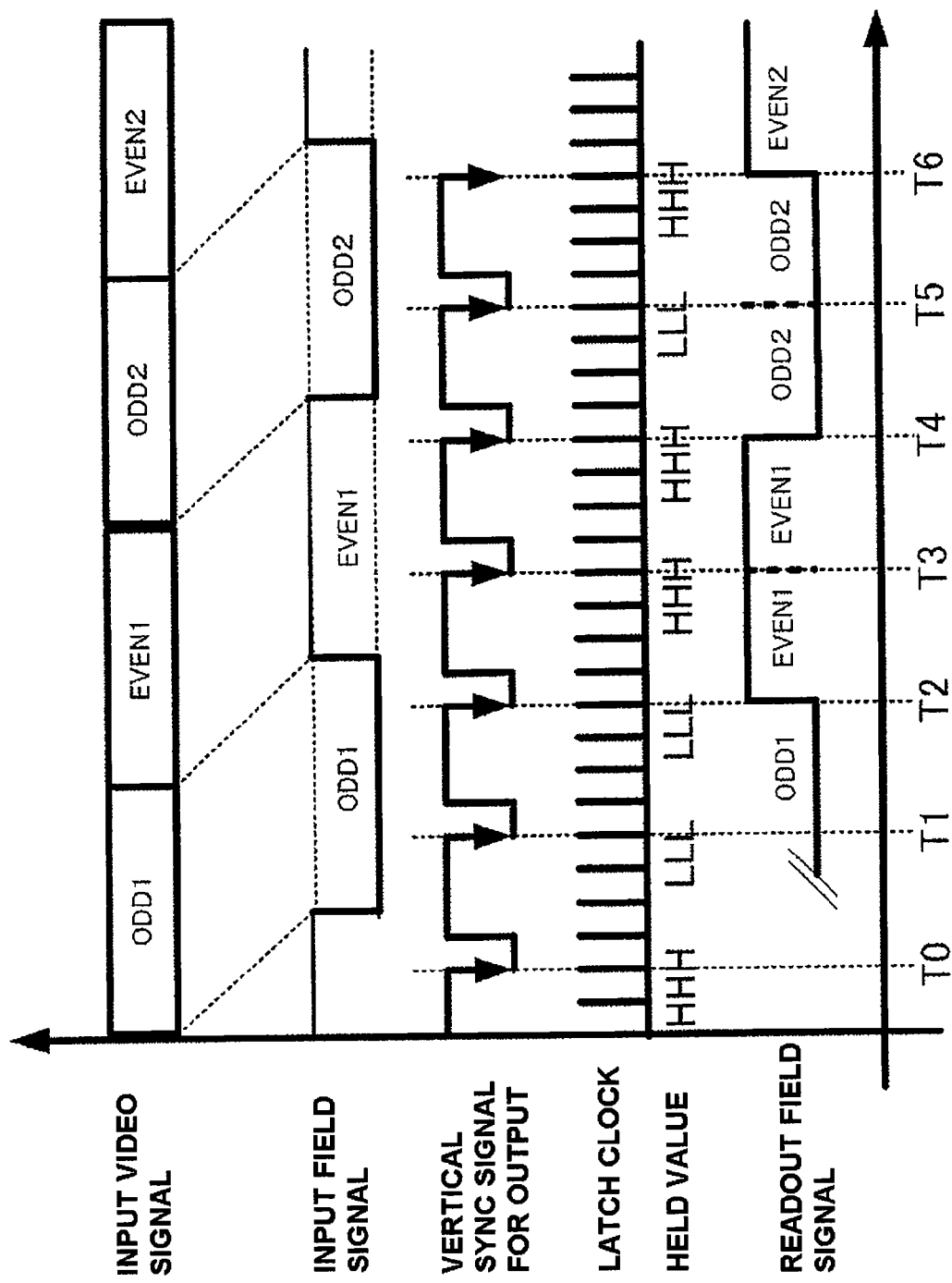
FIG. 5 is a timing chart for explaining video signal readout timing in the apparatus.

The processing operation of the video signal processing apparatus 1 configured as described above will be described with reference to FIGS. 2 to 5. FIG. 2 is a flowchart of the video signal processing apparatus 1 in the first embodiment of the present invention. FIG. 3 is a diagram for explaining the generation of the readout field signal performed by the readout determination section 10. FIGS. 4 and 5 are diagrams for explaining video signal readout timing in the video signal processing apparatus 1 in the first embodiment of the present invention.

In the state (at the start) shown in FIG. 2, the input video signal is stored in the frame memory 4 with every occurrence of the input field period, and the input determination section 8 outputs as input field signal the result of determination as to whether the input video signal is an odd field or an even field. Also, the field signal holding section 9 continues outputting the held value signal.

When the process is started, the field signal holding section 9 determines whether the vertical sync signal for output is falling or not (S01). If the vertical sync signal for output is falling (YES in S01), the readout determination section 10 determines, on the basis of the first held value and the second held value which are the values held by the field signal holding section 9, the video signal of the field to be read out from the frame memory 4, and outputs the result of this determination as readout field signal (S02). If the vertical sync signal for output is not falling (NO in S01), the field signal holding section 9 again performs S01.

The method of determination (S02) in the readout determination section 10 will be described with reference to FIG. 3. "L" in FIG. 3 means that the value of the signal is LOW, and "H" means that the value of the signal is HIGH.

The readout determination section 10 outputs, on the basis of the first held value and the second held value, as readout field signal, a value obtained by inverting the first held value or the second held value. More specifically, the readout determination section 10 outputs as readout field signal the value obtained by inverting the second held value in the case where all of the first held values and the second held values are equal to each other, or in the case where the first held values are not equal to each other.

In the case where the first held values are equal to each other, and where the second held values are not equal to each other, the readout determination section 10 outputs the first held value as readout field signal.

Referring to FIG. 3, for example, in the case where the first held values are "LLL", and where the second held values are also "LLL", all of the first held values and the second held values are equal to each other and, therefore, the value "H" obtained by inverting the second held value is output as readout field signal. As the second held value to be inverted, the value from the signal holding section 9A for example is used.

Referring again to FIG. 3, for example, in the case where the first held values are other than "LLL" or "HHH", the first held values are not equal to each other and the value obtained by inverting the second held value is output as readout field signal.

Referring again to FIG. 3, for example, in the case where the first held values are "LLL" while the second held values are other than "LLL", the first held values are equal to each other; the second held values are not equal to each other; and the first held value "L" is output as readout field signal. As the first held value, the value from the signal holding section 9A for example is used.

After S02, the memory readout control section 5 reads out, on the basis of the readout field signal output from the readout determination section 10, the video signal stored in the frame memory 4 (S03).

After S03, the video display control section 6 performs control to transmit to the display section 7 the output video signal readout from the memory readout control section 5. The display section 7 displays the output video signal as an image (S04).

After S04, determination is made by control means (not shown) as to whether or not the power supply for the video signal processing apparatus 1 has been turned off (S05). If the power supply has not been turned off (NO in S05), the control means (not shown) returns the process to S01. If the power supply has been turned off (YES in S05), the control means (not shown) ends the process.

An example of the processing operation of the above-described video signal processing apparatus 1 will be described with reference to FIGS. 4 and 5.

FIG. 4 shows an example of a case in which the readout field period is longer than the input field period.

As shown in FIG. 4, the output values from the field signal holding section 9 at the time of a fall of the vertical sync signal for output are the first held values and the second held values. For example, at time T1, the first held values (the values from the signal holding sections 9A, 9B, and 9C) are "HHL" and the second held values (the values from the signal holding sections 9A, 9B, and 9C) are "HHH".

The readout field signal output from the readout determination section 10 will be described.

At time T1 in FIG. 4, the first held values are "HHL" and the second held values are "HHH". At this time, since the first held values are not equal to each other, the value "L" obtained by inverting the second held value (the value from the signal holding section 9A) is output as readout field signal.

At time T2 in FIG. 4, the first held values are "LLL" and the second held values are "HHL". At this time, since the first held values are equal to each other, and since the second held values are not equal to each other, the value "L" of the first held value (the value from the signal holding section 9A) is output as readout field signal.

At time T3 in FIG. 4, the first held values are "HHH" and the second held values are "LLL". At this time, since the first held values are equal to each other, and since the second held values are different from "HHH", the value "H" of the first held value (the value from the signal holding section 9A) is output as readout field signal.

FIG. 5 shows an example of a case in which the readout field period is shorter than the input field period.

For example, at time T2, the first held values are "LLL" and the second held values are "LLL". At this time, since all of the first held values and the second held values are equal to each other, the value "H" obtained by inverting the second held value (the value from the signal holding section 9A) is output as readout field signal.

At time T3, the first held values are "HHH" and the second held values are "HHH". At this time, since all of the first held values and the second held values are equal to each other, the value "L" obtained by inverting the second held value (the value from the signal holding section 9A) is output as readout field signal.

While examples in which there is a significant difference between the input field period and the readout field period have been described with reference to FIGS. 4 and 5 for ease of description, the input field period and the readout field period may be set to values close to each other, e.g., 16.683 milliseconds and 16.686 milliseconds.

The video signal processing apparatus 1 of the present invention holds the value of the input field signal a plurality of times with every occurrence of the readout field period, and determines, on the basis of the held value of the current field of the readout field signal and the held value of the immediately preceding field of the readout field signal, the video signal of the field to be read out. One of the odd and even fields to be read out is determined on the basis of whether or not the input field signal has changed with respect to each occurrence of the readout field period, thus reducing unevenness of the fields to be read out.

Thus, overtaking of fields of a video signal and continuous display of the video signal of the same field can be minimized and degradation in image quality of the video signal to be output can be reduced.

Second embodiment

A second embodiment of the present invention will be described with reference to the drawings.

Figure 6:
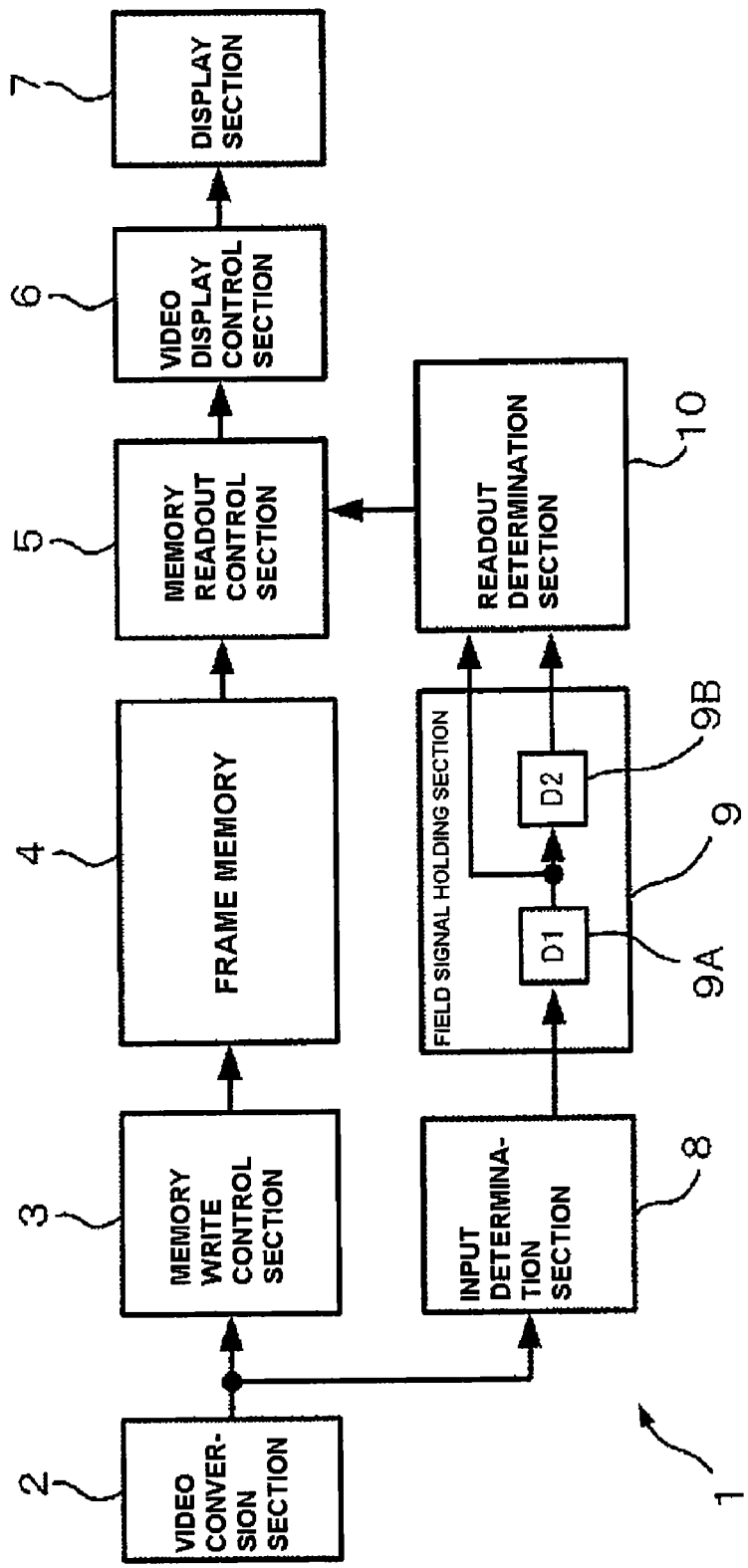
FIG. 6 is a block diagram of a video signal processing apparatus in a second embodiment of the present invention.

FIG. 6 is a block diagram of a video signal processing apparatus in a second embodiment of the present invention. FIG. 7 is a diagram for explaining determination at the time of readout of a video signal in the apparatus.

The same components as those in the first embodiment are indicated by the same reference numerals and the description for them will not be repeated. Description will be made only of points of difference in detail.

Referring to FIG. 6, a point of difference from the first embodiment resides in that while the field signal holding section 9 in the first embodiment is constituted by three stages (signal holding sections 9A, 9B, and 9C), the field signal holding section 9 in the second embodiment is constituted by two stages (signal holding sections 9A and 9B).

The method of determination in the readout determination section 10 will be described with reference to FIG. 7.

The readout determination section 10 outputs as readout field signal the value obtained by inverting the second held value in the case where all of the first held values and the second held values are equal to each other, or in the case where the first held values are not equal to each other. In the case where the first held values are equal to each other, and where the second held values are not equal to each other, the readout determination section 10 outputs the first held value as readout field signal.

Referring to FIG. 7, for example, in the case where the first held values are "LL" and the second held values are also "LL", all of the first held values and the second held values are equal to each other and, therefore, the value "H" obtained by inverting the second held value is output as readout field signal. As the second held value to be inverted, the value from the signal holding section 9A for example is used.

Referring again to FIG. 7, for example, in the case where the first held values are other than "LL" or "HH", the first held values are not equal to each other and the value obtained by inverting the second held value is output as readout field signal.

Referring again to FIG. 7, for example, in the case where the first held values are "LL", and where the second held values are other than "LL", the first held values are equal to each other; the second held values are not equal to each other, and the first held value "L" is output as readout field signal. As the first held value, the value from the signal holding section 9A for example is used.

The number of stages constituted by the signal holding sections in the field signal holding section 9 may be two or more. This is because if the value of the input field signal can be held at least at two times with every occurrence of the readout field period, determination can be made as to whether or not the input field signal has changed.

The configuration of the field signal holding section 9 having two stages is effective in reducing degradation in image quality of the video signal to be output while reducing the scale of the electronic circuit in comparison with the first embodiment.

As described above, the present invention enables reducing degradation in image quality of the video signal to be output, and is useful in application to a video signal processing apparatus or the like, in which an input interlaced video signal is output with a field period different from the field period of the input video signal.

What is claimed is:

1. A video signal processing apparatus which outputs an input interlaced video signal with a readout field period different from the field period of the input video signal, the apparatus comprising:
    a frame memory in which the input video signal is stored on a field-by-field basis;
    an input determination section which determines whether the input video signal is an odd field or an even field, and which outputs the determination result as an input field signal;
    a field signal holding section which holds the value of the input field signal a plurality of times with at least every occurrence of the readout field period, and which outputs a held value signal constituted of the plurality of values of the input field signal held;
    a readout determination section which determines, on the basis of the held value signal output from the field signal holding section, the field to be read out, and which outputs the determination result as a readout field signal; and
    a memory readout control section which reads out, on the basis of the readout field signal output from the readout determination section, the input video signal stored in the frame memory;
    wherein the readout determination section determines the field to be read out on the basis of a first held value which is a value of the held value signal in the current readout field period and a second held value which is a value of the held value signal in the immediately preceding readout field period.

2. The video signal processing apparatus according to claim 1, wherein the readout determination section outputs, as the readout field signal the latest input field signal constituting the first held value or a value obtained by inverting the latest input field signal constituting the second held value.

3. The video signal processing apparatus according to claim 1, wherein the readout determination section outputs, as the readout field signal, a value obtained by inverting the latest input field signal constituting the second held value in a case where all of the plurality of input field signals constituting the first held value and the plurality of input field signals constituting the second held value are equal to each other or in a case where the plurality of input field signals constituting the first held value are not equal to each other, and
    wherein the readout determination section outputs, as the readout field signal, the input field signal constituting the first held value in a case where all of the plurality of input field signals constituting the first held value are equal to each other, and where the plurality of input field signals constituting the second held value are not equal to each other.

* * * * *